United States Patent
Ishizuka et al.

(10) Patent No.: US 6,880,538 B2
(45) Date of Patent: Apr. 19, 2005

(54) BLOWBY GAS CIRCULATING APPARATUS FOR AN INTERNAL COMBUSTION ENGINE

(75) Inventors: Takashi Ishizuka, Yokohama (JP); Michihiro Yamane, Kanagawa (JP); Norio Ito, Nagoya (JP); Takashi Satake, Nagoya (JP); Munehiro Sagata, Aichi (JP)

(73) Assignees: Nissan Motor Co., Ltd., Yokohama (JP); Aichi Machine Industry Co., Ltd., Nagoya (JP); Renault s.a.s. societe par actions simplifiee, Boulogne-Billsncourt (FR)

( * ) Notice: Subject to any disclaimer, the term of this patent is extended or adjusted under 35 U.S.C. 154(b) by 79 days.

(21) Appl. No.: 10/775,132

(22) Filed: Feb. 11, 2004

(65) Prior Publication Data

US 2004/0159314 A1 Aug. 19, 2004

(30) Foreign Application Priority Data

Feb. 14, 2003 (JP) ........................................ 2003-036859

(51) Int. Cl.⁷ ............................................... F02B 25/06
(52) U.S. Cl. .................................... 123/572; 123/90.38
(58) Field of Search .............................. 123/90.38, 572, 123/195 C (56) References Cited

U.S. PATENT DOCUMENTS

| 4,493,295 A | | 1/1985 | Ampferer |
| 4,565,164 A | * | 1/1986 | Satoh et al. ............. 123/41.86 |
| 4,602,607 A | | 7/1986 | Balsley |
| 5,850,823 A | * | 12/1998 | Kasahara ................... 123/572 |

FOREIGN PATENT DOCUMENTS

| EP | 0 341 770 A2 | 11/1989 |
| JP | 1-257709 A | 10/1989 |
| JP | 5-30412 U | 4/1993 |

* cited by examiner

Primary Examiner—Thomas Denion
Assistant Examiner—Zelalem Eshete
(74) Attorney, Agent, or Firm—Foley & Lardner LLP (57) ABSTRACT

An apparatus for circulating a blowby gas to engine cylinders in an internal combustion engine, including a cylinder head cover including a first wall defining a first passage, and a first flange outwardly extending from the first wall, and a cylinder head including a second wall and a second flange cooperating with the first flange to form an abutting surface therebetween on which a second passage is arranged. The second passage is connected with the first passage and extending in a direction of a row of the engine cylinders. The second wall defines a plurality of third passages each having one end that is open to the second flange and communicated with the second passage and an opposite end open to an intake port of each of the engine cylinders.

23 Claims, 8 Drawing Sheets

BLOWBY GAS CIRCULATING APPARATUS FOR AN INTERNAL COMBUSTION ENGINE

BACKGROUND OF THE INVENTION

The present invention relates to an apparatus for circulating a blowby gas within a crankcase of an internal combustion engine to an intake system via a valve chamber within a cylinder head, and, specifically, to an improved blowby gas circulating apparatus for delivering the blowby gas from the valve chamber into engine cylinders.

Japanese Utility Model Application First Publication No. 5-30412 discloses a blowby gas circulating apparatus for an internal combustion engine, in which a blowby gas path is formed in a flange of an intake manifold mounted to a side surface of a cylinder head. A blowby gas flowing from the cylinder head is delivered into the blowby gas path via a hose and then distributed into four engine cylinders. The blowby gas path is provided in the form of a recess formed on an end surface of the intake manifold flange which abuts on the side surface of the cylinder head. The blowby gas path has a so-called tournament structure. The blowby gas path includes an inlet, two upstream passages branched from the inlet in a fore-and-aft direction along a row of the four engine cylinders, and two downstream passages branched from each of the two upstream passages in the fore-and-aft direction.

SUMMARY OF THE INVENTION

However, in the above-described related art, the intake manifold flange has a considerably large size because the blowby gas path is formed in the intake manifold flange. This causes an increase in a mount area of the side surface of the cylinder head to which the intake manifold is mounted. As a result, a total weight of the intake manifold and the cylinder head will undergo a significant increase.

Further, although the blowby gas path having the tournament structure is advantageous in equally distributing the blowby gas to the engine cylinders, the size of the intake manifold flange and the mount area of the cylinder head become large. This is because the branch passages of the tournament-type blowby gas path are arranged on a same plane.

It is an object of the present invention to provide an improved blowby gas circulating apparatus having a blowby gas path for equally distributing a blowby gas to engine cylinders without increasing the size of a cylinder head and components which cooperate with each other to form the blowby gas path.

In one aspect of the present invention, there is provided an apparatus for circulating a blowby gas to engine cylinders in an internal combustion engine, the engine cylinders having intake ports, respectively, the apparatus comprising:

a cylinder head cover including a first wall defining a first passage, and a first flange outwardly extending from the first wall; and a cylinder head including a second wall and a second flange cooperating with the first flange to form an abutting surface therebetween on which a second passage is arranged, the second passage being connected with the first passage and extending in a direction of a row of the engine cylinders, the second wall defining a plurality of third passages each having one end that is open to the second flange and communicated with the second passage and an opposite end open to the intake port of each of the engine cylinders.

In a further aspect of the present invention, there is provided an apparatus for circulating a blowby gas within a valve chamber to engine cylinders in an internal combustion engine, the valve chamber being defined by a cylinder head and a cylinder head cover between which an abutting surface is disposed, the engine cylinders having intake ports, respectively, the apparatus comprising:

first wall means for defining a first passage for delivering the blowby gas discharged from the valve chamber in a direction parallel to the abutting surface, the first passage extending in the cylinder head cover;

second wall means for defining a second passage for allowing the blowby gas passing through the first passage to flow along the abutting surface, the second passage extending on the abutting surface; and third wall means for defining a plurality of third passages for delivering the blowby gas passing through the second passage into the intake ports of the engine cylinders, the plurality of third passages extending in the cylinder head.

DETAILED DESCRIPTION OF THE INVENTION

Referring to FIGS. 1 to 8, a blowby gas circulating apparatus according to an embodiment of the present invention now is explained. In this embodiment, the blowby gas circulating apparatus is applied to an in-line four-cylinder internal combustion engine of a vehicle. The blowby gas circulating apparatus has a blowby gas path formed in cylinder head 1 and cylinder head cover 2 as indicated by a series of arrows in FIG. 1. Cylinder head 1 has an upper opening on an upper side thereof. Cylinder head cover 2 has a lower opening on a lower side thereof. As illustrated in FIG. 2A, cylinder head cover 2 is so disposed as to cover the upper opening of cylinder head 1 and cooperate with cylinder head 1 to define valve chamber 3 in which intake camshaft 5 for driving intake valve 4 is accommodated together with an exhaust camshaft, not shown. A blowby gas flowing from a crankcase, not shown, into valve chamber 3 is circulated to an intake system, specifically, to intake port 6 of each of the four engine cylinders.

Figure 1:
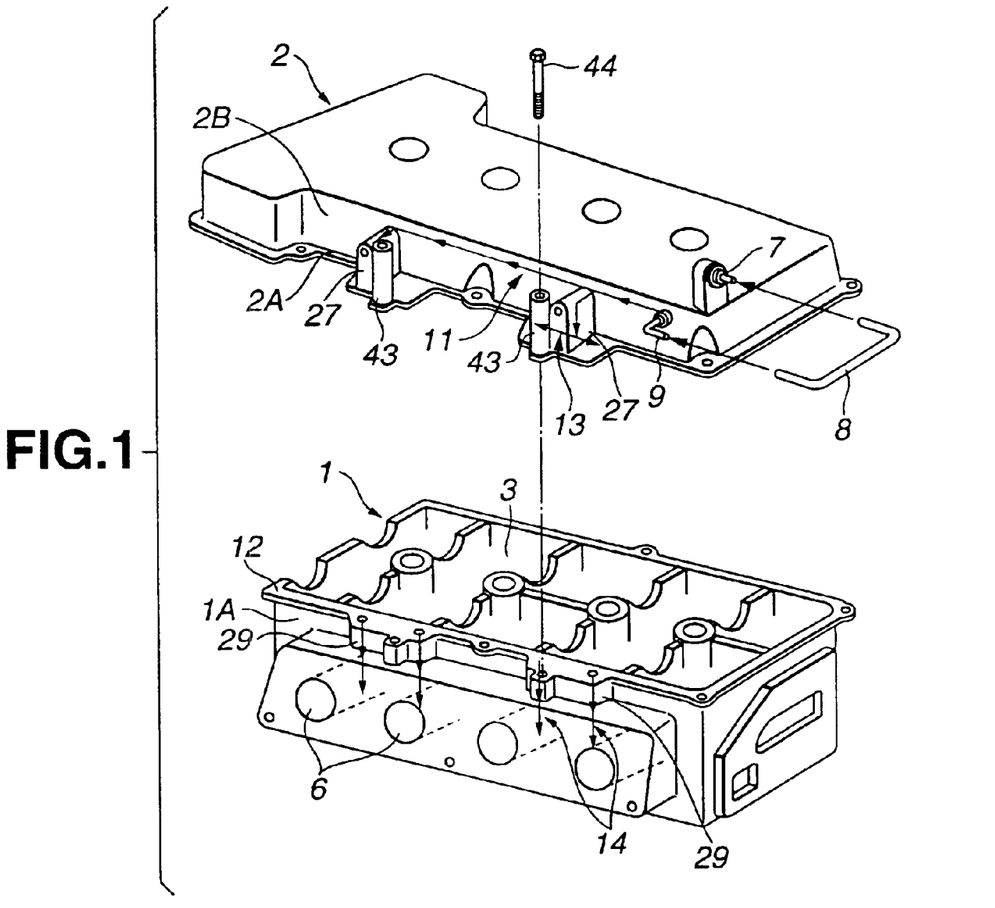
FIG. 1 is an exploded perspective view of a blowby gas circulating apparatus according to an embodiment of the present invention, including a cylinder head cover and a cylinder head which are formed with a blowby gas path.

As illustrated in FIG. 1, blowby gas control valve (PCV) 7 is mounted to one end portion of an upper surface of cylinder head cover 2. Blowby gas control valve 7 is operative to adjust a flow amount of the blowby gas based on intake negative pressure. A flow of blowby gas discharged from valve chamber 3 via blowby gas control valve 7 is introduced into first passage 11 formed in side wall 2B of cylinder head cover 2, via rubber hose 8 and connector 9 which constitute an external pipe. The blowby gas flow is split to branch flows passing through a pair of second passages 13 that are formed along abutting surface P shown in FIG. 2A. Upper flange 12 of cylinder head 1 and lower flange 2A of cylinder head cover 2 abut on each other on abutting surface P. As shown in FIG. 1, upper flange 12 of cylinder head 1 outwardly extends from side wall 1A around a periphery of the upper opening. Lower flange 2A of cylinder head cover 2 outwardly extends from side wall 2B around a periphery of the lower opening. The branch flows of blowby gas passing through the pair of second passages 13 are then delivered to intake ports 6 of the engine cylinders via two pairs of third passages 14. Third passages 14 are formed in cylinder head 1. The blowby gas is thus distributed to each of the engine cylinders.

Figure 3:
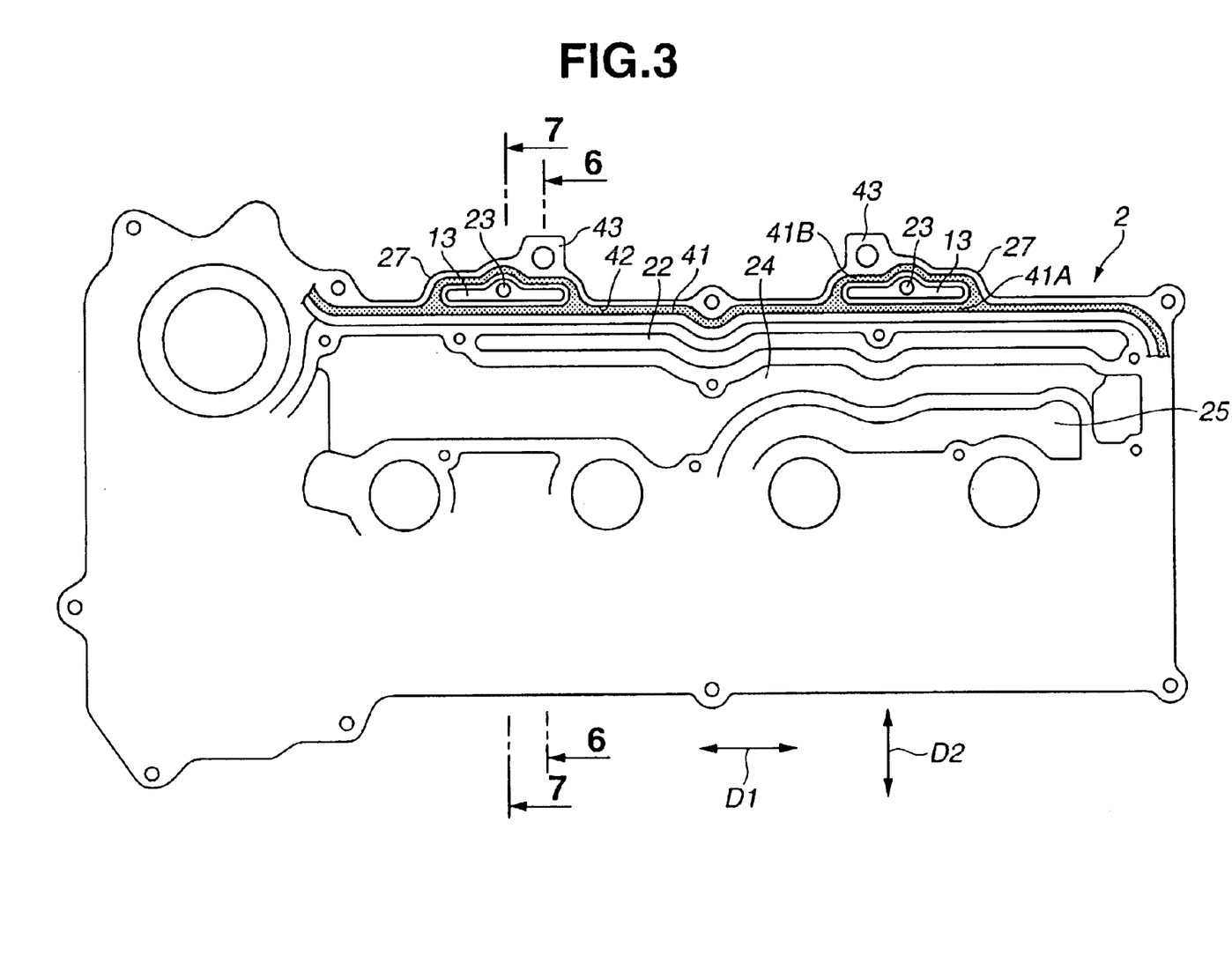
FIG. 3 is a schematic plan view of the cylinder head cover, showing an essential part of an inside structure of the cylinder head cover.
Figure 6:
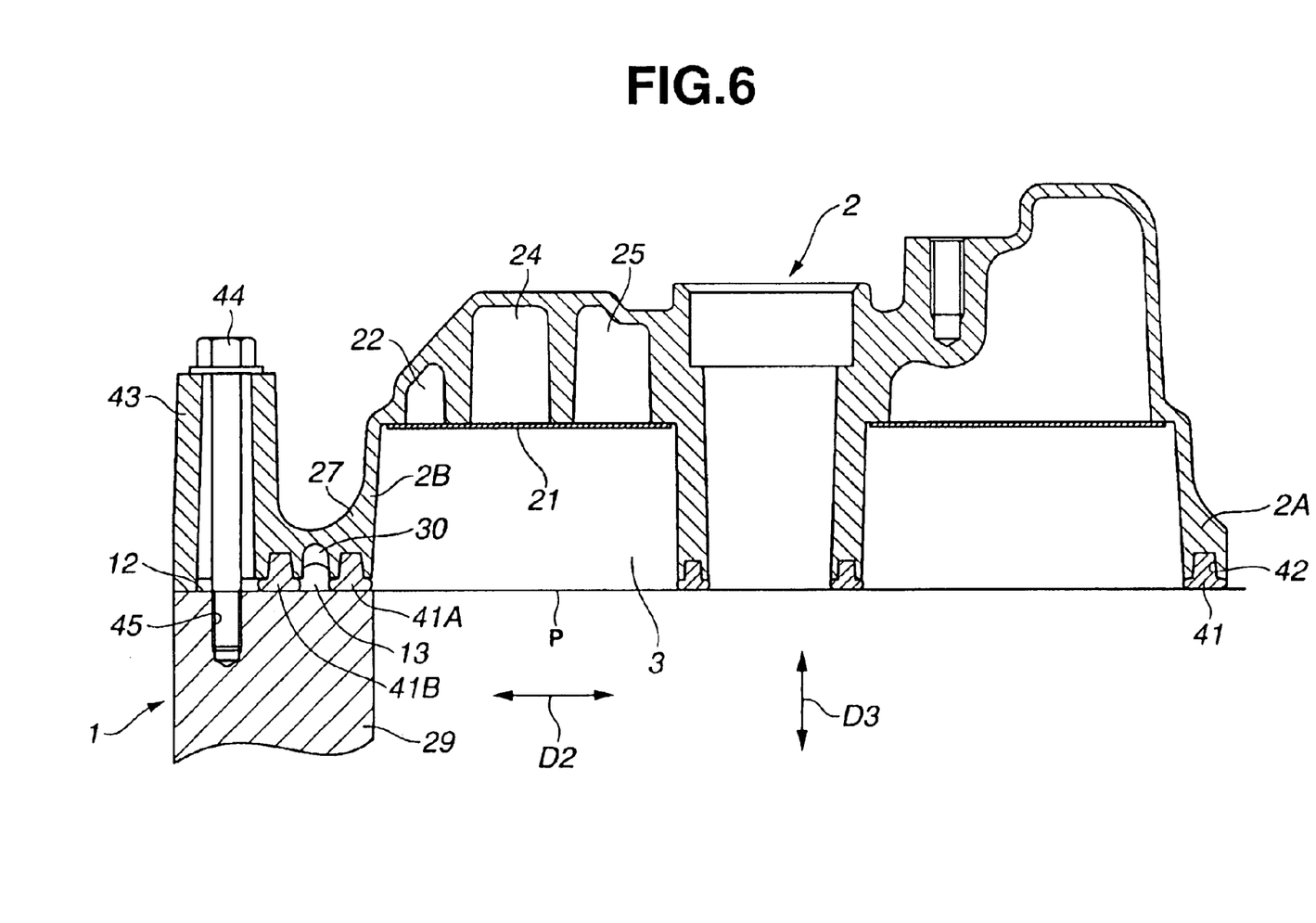
FIG. 6 is a sectional view of the blowby gas circulating apparatus, taken along line 6—6 of FIG. 3.
Figure 7:
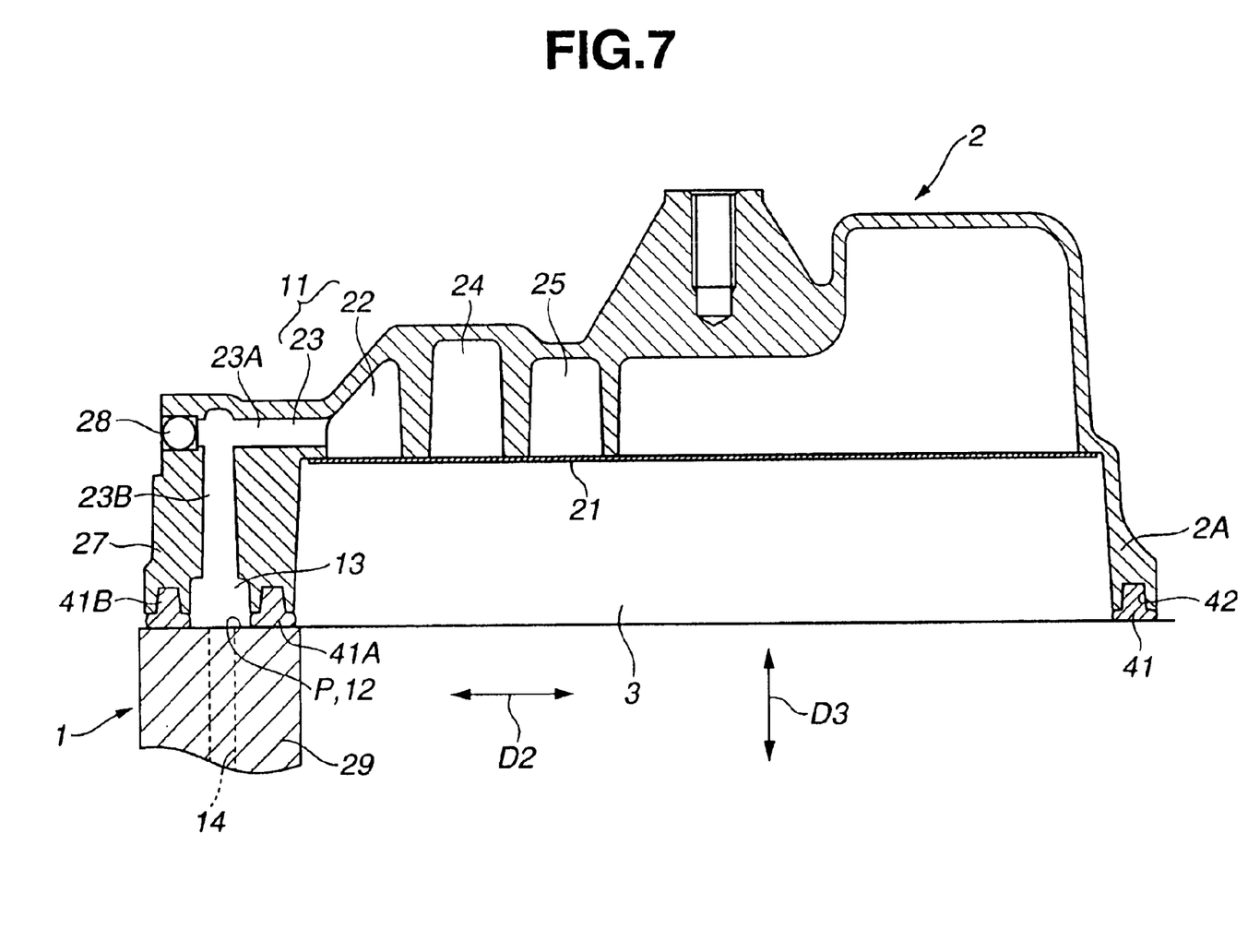
FIG. 7 is a sectional view of the blowby gas circulating apparatus, taken along line 7—7 of FIG. 3.

Referring to FIGS. 3, 6 and 7, first passage 11 will be explained hereinafter. First passage 11 includes common blowby gas main passage 22 and a pair of communication passages 23 branched from blowby gas main passage 22 toward second passage 13 as shown in FIG. 7. As illustrated in FIGS. 6 and 7, blowby gas main passage 22 is defined by cylinder head cover 2 and plate 21 mounted inside cylinder head cover 2. Cylinder head cover 2 includes a top wall having an elongated recess or groove on an inside surface thereof. Plate 21 is arranged to cover the groove and define blowby gas main passage 22. As illustrated in FIG. 3, blowby gas main passage 22 straightly extends in direction D of a row of the engine cylinders. Oil separation passage 24 and fresh air induction passage 25 are also formed in the top wall of cylinder head cover 2 and disposed spaced from blowby gas main passage 22. Oil separation passage 24 serves for separating an oil from the blowby gas. Fresh air induction passage 25 serves for introducing fresh air into valve chamber 3. Blowby gas main passage 22 is disposed on the side of intake valve 4 and placed in an outer-most position close to side wall 2B of cylinder head cover 2, relative to oil separation passage 24 and fresh air induction passage 25. Blowby gas main passage 22 is positioned on the side of intake valve 4. Fresh air induction passage 25 is placed in an inner-most position distant from side wall 2B, relative to and blowby gas main passage 22 and oil-separation passage 24. Oil separation passage 24 is disposed between blowby gas main passage 22 and fresh air induction passage 25. Blowby gas main passage 22 has one end connected with connector 9 shown in FIG. 1. Oil separation passage 24 has one end connected with blowby gas control valve 7 shown in FIG. 1, and the other end open to valve chamber 3.

As illustrated in FIG. 7, each of the pair of communication passages 23 has a generally L-shape and includes lateral communication passage 23A branched from blowby gas main passage 22, and vertical communication passage 23B connected with lateral communication passage 23A. Lateral communication passage 23A extends in direction D2 perpendicular to direction D1 and in a direction parallel to abutting surface P between cylinder head cover 2 and cylinder head 1. Vertical communication passage 23B extends in a direction perpendicular to abutting surface P, namely, in direction D3 perpendicular to directions D1 and D2. Specifically, cylinder head cover 2 has a pair of expansions 27 outwardly expanding or swelling from portions of side wall 2B which are spaced from each other in direction D1 of the row of the engine cylinders. Expansions 27 are thus formed at the portions spaced apart from each other in direction D1 and joined to lower flange 2A. Communication passage 23 is formed in each of expansions 27. Lateral communication passage 23A is formed by machining after die forming of cylinder head cover 2. An open end of lateral communication passage 23A is closed by ball plug 28 press-fitted thereinto. Meanwhile, terms "lateral" and "vertical" are used to indicate the directions with respect to abutting surface P and not to strictly indicate horizontal and vertical directions in the internal combustion engine under the assembling and operating conditions.

Figure 4:
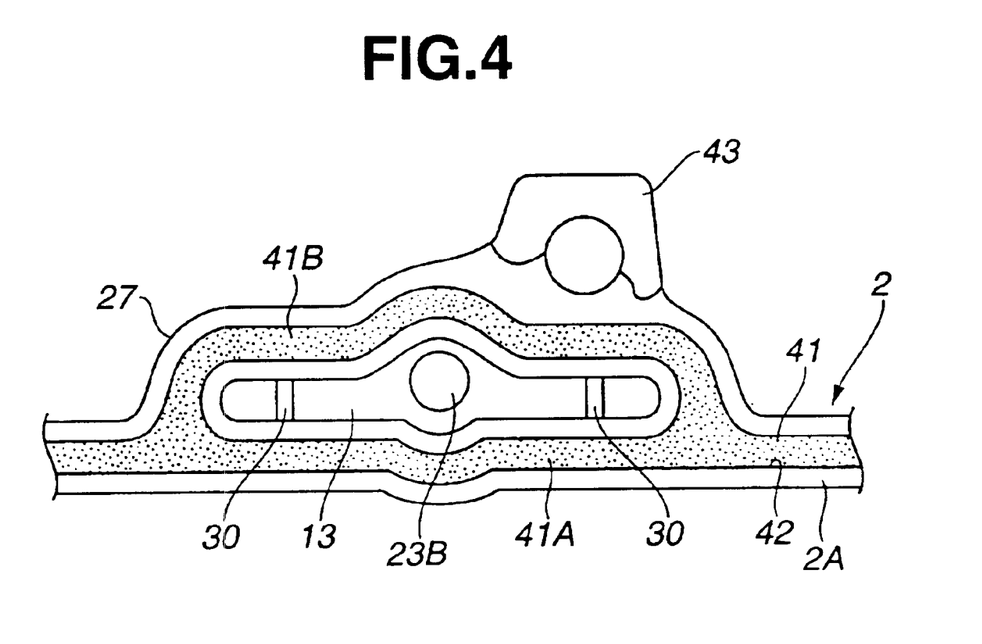
FIG. 4 is an enlarged view of a portion of the essential part of the cylinder head cover shown in FIG. 3.

As illustrated in FIGS. 3 and 4, each of expansions 27 is elongated in direction D1 of the row of the engine cylinders. A groove defining second passage 13 is formed on an underside surface of lower flange 2A with expansion 27. The groove extends over a predetermined length in direction D1 as shown in FIG. 3. Namely, second passage 13 has the predetermined length extending in direction D1. Vertical communication passage 23B of communication passage 23 has a lower end open to a middle portion of second passage 13 in the length direction.

Figure 5:
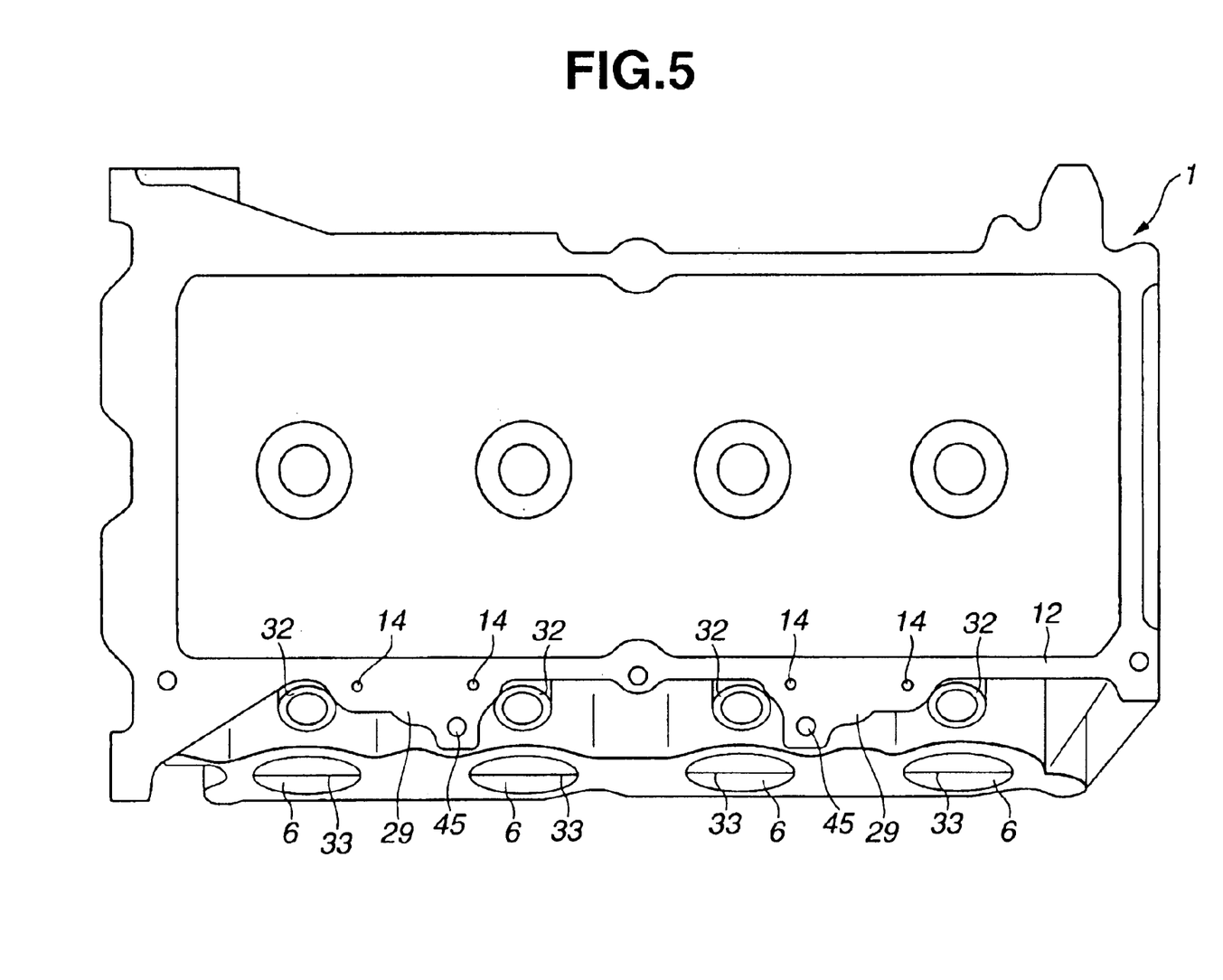
FIG. 5 is a schematic top plan view of the cylinder head.

As illustrated in FIG. 5, cylinder head 1 has a pair of expansions 29 outwardly expanding or swelling from portions of side wall 1A of cylinder head 1 which are spaced from each other in a longitudinal direction of cylinder head 1. Expansions 29 are thus formed at the portions spaced apart from each other in the longitudinal direction of cylinder head 1, namely, in direction D1 of the row of engine cylinders. Expansions 29 are joined to upper flange 12 and arranged and elongated so as to correspond to expansions 27 of cylinder head cover 2. A pair of third passages 14 is formed in each of expansions 29 by a suitable method, for instance, drilling. Each of third passages 14 extends through expansions 29 and has one end open to an upper surface of upper flange 12 and an opposite end open to intake port 6 of each of the engine cylinders. The one end of third passage 14 is positioned so as to overlap with a part of second passage 13 when cylinder head 1 and cylinder head cover 2 are assembled in a mutually abutting state. Specifically, a pair of third passages 14 are provided corresponding to single second passage 13. The pair of third passages 14 are connected to opposite ends of second passage 13 which are opposed in the length direction. The blowby gas flowing from vertical communication passage 23B into second passage 13 is branched at the middle portion of second passage 13 into two blowby gas flows directed to the opposite ends of second passage 13. The two blowby gas flows passing through the opposite ends of second passage 13 flow through the pair of third passages 14 and enter into two of the engine cylinders. Thus, the blowby gas is distributed into two engine cylinders.

Figure 8:
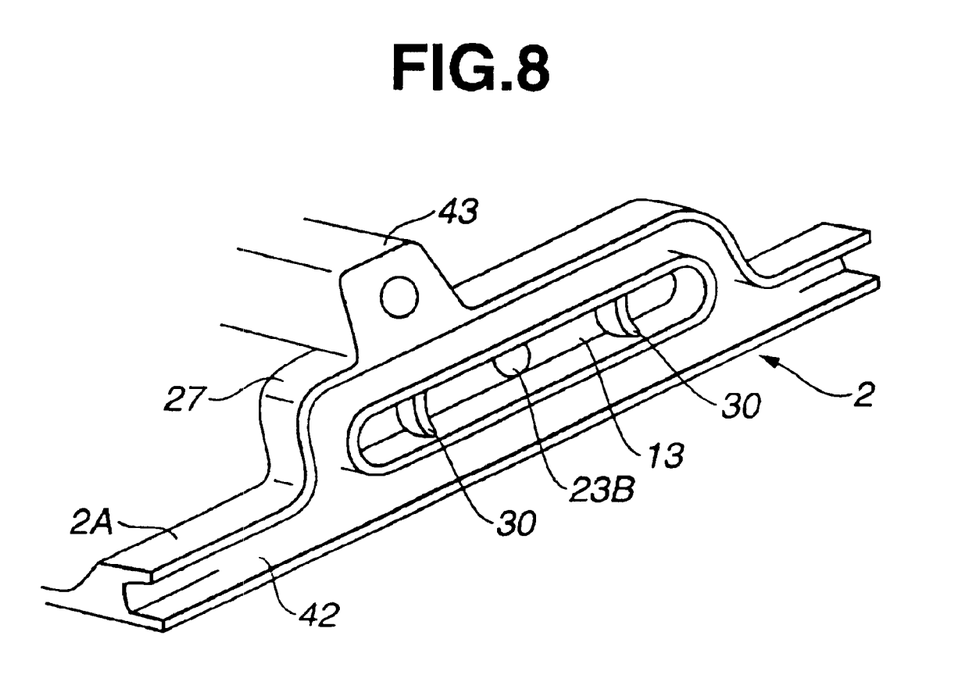
FIG. 8 is a perspective view of an expansion formed on the cylinder head cover.

As illustrated in FIGS. 4 and 8, a pair of partition walls 30 are disposed within second passage 13. Each of partition walls 30 is located at a bottom of the groove defining second passage 13 and may be formed integrally with lower flange 2A. Partition wall 30 determines substantially a cross-sectional area of second passage 13. With the arrangement of partition wall 30, a flow amount of the blowby gas flowing from vertical communication passage 23B into third passage 14 via second passage 13 can be suitably regulated. This blowby gas regulation using partition wall 30 can be readily utilized upon changing specifications of the internal combustion engine and adjusting characteristics of distribution of the blowby gas to each of the engine cylinders.

Figure 2A:
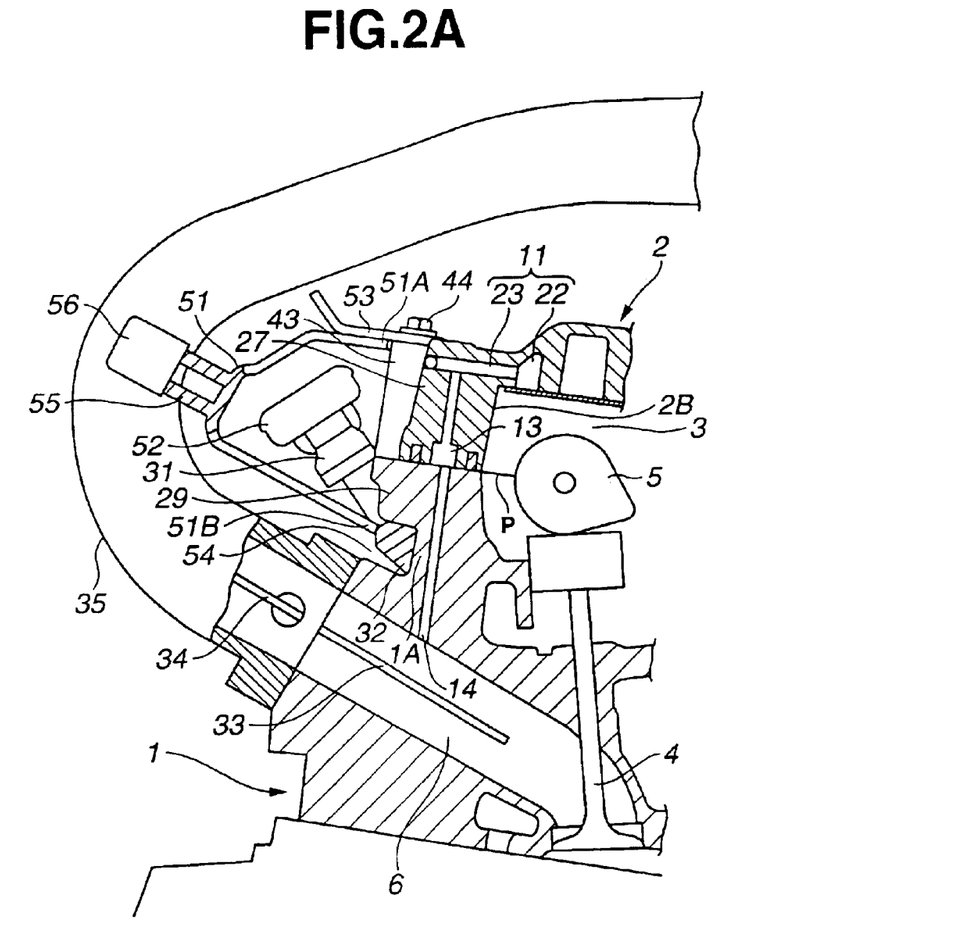
FIG. 2A is a sectional view of a part of the blowby gas circulating apparatus in an assembled state.
Figure 2B:
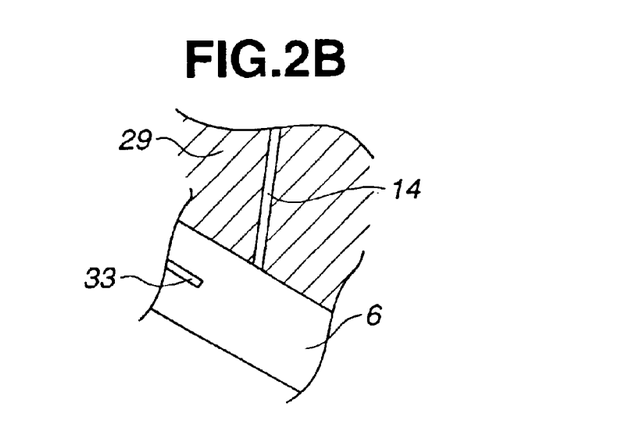
FIG. 2B is a view partially similar to FIG. 2A, but showing a modification of the embodiment.

In this embodiment, the engine has two intake valves 4 per engine cylinder. Intake port 6 has a Y-shaped branch portion at a downstream portion thereof near intake valves 4. As illustrated in FIG. 2A, fuel injection valve mount portion 32 to which fuel injection valve 31 is mounted is disposed above an inlet portion of intake port 6. As illustrated in FIG. 5, third passage 14 is arranged in such a position as to prevent the interference with fuel injection valve mount portion 32. Further, a pair of third passages 14 are disposed between a pair of the engine cylinders. With this arrangement of third passages 14, the length of second passage 13 is relatively small. Further, as shown in FIG. 2A, an intake path within intake port 6 is divided into upper and lower intake passages by partition wall 33. Intake control valve 34 that is operative to open and close only the lower intake passage is disposed within an outlet portion of intake manifold 35. Intake air can be always introduced into the upper intake passage regardless of the open and close operations of intake control valve 34. Third passage 14 is open into the upper intake passage to thereby be communicated therewith. FIG. 2B illustrates a modification of the embodiment in which the opposite end of third passage 14 is open into the intake path of intake port 6 downstream of partition wall 33.

As illustrated in FIGS. 6 and 7, seal or gasket 41 is interposed between cylinder head 1 and cylinder head cover 2 and seals valve chamber 3. Gasket 41 is made of rubber and formed into a generally rectangular frame. Gasket 41 is fitted into gasket groove 42 that is formed in lower flange 2A and expansion 27 of cylinder head cover 2. Gasket 41 is held in a state compressed between lower flange 2A and expansion 27 of cylinder head cover 2 and upper flange 12 and expansion 29 of cylinder head 1. Further, as illustrated in FIGS. 3 and 4, gasket 41 includes a second passage seal portion extending along an entire periphery of the groove defining second passage 13. Specifically, the second passage seal portion includes main seal portion 41A straightly extending along a periphery of valve chamber 3, and subseal portion 41B disposed outside main seal portion 41A and having a flattened C-shape as best shown in FIG. 4. Gasket groove 42 includes a portion formed so as to be engaged with main seal portion 41A and sub-seal portion 41B of the second passage seal portion. The second passage seal portion surrounds and seals an entire periphery of second passage 13.

Cylinder head cover 2 is secured to cylinder head 1 by using a plurality of bolts, not shown, along a periphery thereof. Further, expansion 27 of cylinder head cover 2 and expansion 29 of cylinder head 1 are fixedly coupled with each other in order to enhance sealing around second passage 13 to which negative pressure is applied. Specifically, as illustrated in FIGS. 2 and 6, cylindrical boss portion 43 is formed in expansion 27 of cylinder head cover 2. Bolt 44 acting as a fastening member extends through boss portion 43 and is screwed into bolt hole 45 formed in expansion 29 of cylinder head 1. As illustrated in FIG. 6, boss portion 43 and bolt 44 are located outside sub-seal portion 41B of gasket 41. This further ensures the sealing at sub-seal portion 41B.

Further, boss portion 43 and bolt 44 are used for supporting protection cover 51 for a fuel system. Specifically, as illustrated in FIG. 2A, fuel tube 52 for supplying fuel to fuel injection valve 31 is arranged on side wall 1A of cylinder head 1. Fuel tube 52 extends in direction D1 of the row of the engine cylinders. Generally U-shaped intake manifold 35 is arranged around an outside of fuel tube 52. Protection cover 51 is disposed between fuel tube 52 and intake manifold 35 so as to cover fuel tube 52 and prevent fuel tube 52 from being crushed by intake manifold 35 at the occurrence of vehicle collision. Protection cover 51 is made of metal and formed into a channel shape having a generally U-shaped section. Protection cover 51 can be provided by subjecting a steel plate to press forming. Protection cover 51 is disposed such that an open end of the generally U-shaped section is oriented substantially toward side wall 2B of cylinder head cover 2. Two fittings 53 are fixed by spot welding to two portions of protection cover 51, respectively, which are spaced from each other in a longitudinal direction of protection cover 51. Each of fittings 53 is secured to boss portion 43 by bolt 44. Protection cover 51 has upper end portion 51A underlying fitting 53 and opposed to an outer circumferential surface of boss portion 43. Lower end portion 51B of protection cover 51 is a free end and opposed to recess 54 that is formed between upper flange 12 of cylinder head 1 and intake port 6. Further, protection cover 51 has boss 55 at a middle portion thereof in the longitudinal direction thereof. Boss 55 is formed on an outer surface opposite to a bottom of the generally U-shaped section and coupled with boss 56 of intake manifold 35 by means of a bolt, not shown. Thus, protection cover 51 is supported at three portions, namely, the two portions fixed to boss portion 43 of cylinder head cover 2 and one portion, i.e., boss 55, fixed to boss 56 of intake manifold 35. In a case where intake manifold 35 is deformed rightward in FIG. 2A in the occurrence of vehicle collision, protection cover 51 is urged by intake manifold 35 to be detached from fitting 53 spot-welded thereto and upper end portion 51A of protection cover 51 is caused to be in contact with boss portion 43 of cylinder head cover 2. At the same time, lower end portion 51B of protection cover 51 is displaced within recess 54 to be in contact with side wall 1A of cylinder head 1. As a result, protection cover 51 can hold the generally U-shaped section to thereby protect fuel tube 52 and fuel injection valve 31 inside thereof. Particularly, a load caused upon the collision is shared by a pair of substantially opposed straight portions of the generally U-shaped section of protection cover 51. Therefore, protection cover 51 having a relatively small thickness can bear such a large linear load as compared with a case where shearing or bending load is applied thereto. Further, boss portion 43 of cylinder head cover 2 which is formed integrally with expansion 27 has thickness and rigidity larger than those of a general portion of side wall 2B of cylinder head cover 2 and is fixed to cylinder head 1 by means of bolt 44. Boss portion 43 can sufficiently bear a load inputted from protection cover 51. Meanwhile, cylinder head 1 and cylinder head cover 2 are made of cast aluminum alloy, and intake manifold 35 is made of synthetic resin in this embodiment.

In the blowby gas circulating apparatus as explained above, the blowby gas flow enters into common blowby gas main passage 22 and the pair of communication passages 23 of first passage 11 to thereby be split into two branch flows of blowby gas. Each of the two branch flows enters into each of second passages 13 to thereby be split into two branch flows of blowby gas. The two branch flows of blowby gas passing through second passage 13 enter into the pair of third passages 14 communicated with two of the engine cylinders. As a result, the blowby gas flow discharged from valve chamber 3 is split into the four branch flows in the tournament form, which are delivered into the four engine cylinders, respectively. With the arrangement of the tournament-form blowby gas path, the blowby gas can be readily equally distributed to the engine cylinders. Further, the blowby gas path is not arranged along a same plane, namely, abutting surface P, and has a multilevel structure. Second passage 13 that is arranged on abutting surface P and forms a part of the multilevel structure, simply straightly extends in one direction, namely, direction D1. This serves for minimizing increase in size of cylinder head 1 and cylinder head cover 2 which will be caused in order to form second passage 13 and gasket 41 for sealing second passage 13. Specifically, the pair of expansions 27 are arranged in a spaced relation to each other on side wall 2B of cylinder head cover 2, and the pair of expansions 29 are arranged on side wall 1A of cylinder head 1 corresponding to expansions 27. This results in considerably small increase in outer dimensions and weights of cylinder head 1 and cylinder head cover 2. Further, almost all parts of the blowby gas path are disposed inside cylinder head cover 2, whereby condensation of the blowby gas can hardly occur even in a cold condition.

Further, with the arrangement of third passage 14, the blowby gas can be introduced into a relatively downstream portion of intake port 6. Therefore, intake control valve 34 located upstream of intake port 6 can be prevented from influence of condensation of the blowby gas.

Meanwhile, the arrangement of blowby gas control valve 7 is not limited to this embodiment in which blowby gas control valve 7 is mounted to the upper surface of cylinder head cover 2 and connected with blowby gas main passage 22 via the external pipe including rubber hose. Blowby gas control valve 7 can be installed inside cylinder head cover 2, and the external pipe can be omitted.

This application is based on a prior Japanese Patent Application No. 2003-36859 filed on Feb. 14, 2003. The entire contents of the Japanese Patent Application No. 2003-36859 is hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. An apparatus for circulating a blowby gas to engine cylinders in an internal combustion engine, the engine cylinders having intake ports, respectively, the apparatus comprising:
    a cylinder head cover including a first wall defining a first passage, and a first flange outwardly extending from the first wall; and
    a cylinder head including a second wall and a second flange cooperating with the first flange to form an abutting surface therebetween on which a second passage is arranged, the second passage being connected with the first passage and extending in a direction of a row of the engine cylinders, the second wall defining a plurality of third passages each having one end that is open to the second flange and communicated with the second passage and an opposite end open to the intake port of each of the engine cylinders.

2. The apparatus as claimed in claim 1, wherein the second passage is defined by the second flange of the cylinder head and a groove formed in the first flange of the cylinder head cover.

3. The apparatus as claimed in claim 2, further comprising a seal interposed between the cylinder head cover and the cylinder head, the seal comprising a portion surrounding an entire periphery of the second passage.

4. The apparatus as claimed in claim 2, further comprising a partition wall arranged at a bottom of the groove so as to regulate a flow amount of the blowby gas passing through the second passage.

5. The apparatus as claimed in claim 4, wherein the partition wall is formed integrally with the first flange of the cylinder head cover.

6. The apparatus as claimed in claim 1, wherein the first passage comprises a blowby gas main passage extending in the direction of the row of the engine cylinders and a communication passage communicating the blowby gas main passage with the second passage, the blowby gas main passage being defined by the first wall and a plate disposed inside the cylinder head cover, the communication passage being formed in the first wall of the cylinder head cover.

7. The apparatus as claimed in claim 6, wherein the communication passage comprises a lateral communication passage connected with the blowby gas main passage and extending in a direction parallel to the abutting surface and in a direction perpendicular to the direction of the row of the engine cylinders, and a vertical communication passage extending in a direction perpendicular to the abutting surface and connecting the lateral communication passage with the second passage.

8. The apparatus as claimed in claim 6, wherein the second passage comprises a plurality of second passages for distributing the blowby gas to a pair of the engine cylinders via the plurality of third passages, each of the plurality of second passages being communicated with a common blowby gas main passage via the communication passage.

9. The apparatus as claimed in claim 6, wherein the first wall of the cylinder head cover comprises a first expansion outwardly expanding from a portion of the first wall, the second wall of the cylinder head comprising a second expansion disposed corresponding to the first expansion and outwardly expanding from a portion of the second wall, the second passage being disposed between the first and second expansions, the communication passage extending through the first expansion.

10. The apparatus as claimed in claim 9, wherein the first expansion comprises a boss portion formed integrally therewith, the first and second expansions being coupled with each other using a fastening member disposed at the boss portion.

11. The apparatus as claimed in claim 10, wherein the internal combustion engine comprises a fuel tube disposed on the second wall of the cylinder head, and a protection cover having a generally U-shaped section so as to cover the fuel tube, the protection cover comprising one end portion supported on the boss portion by the fastening member.

12. The apparatus as claimed in claim 1, wherein the internal combustion engine comprises a partition wall dividing an intake path inside the intake port into two intake passages, each of the plurality of third passages having one end open into one of the two intake passages.

13. The apparatus as claimed in claim 12, wherein the one end of each of the plurality of third passages is open into the one of the two intake passages downstream of the partition wall.

14. The apparatus as claimed in claim 1, further comprising a blowby gas control valve operative to adjust a flow amount of the blowby gas flowing into the first passage, the blowby gas control valve being mounted to the cylinder head cover.

15. An apparatus for circulating a blowby gas within a valve chamber to engine cylinders in an internal combustion engine, the valve chamber being defined by a cylinder head and a cylinder head cover between which an abutting surface is disposed, the engine cylinders having intake ports, respectively, the apparatus comprising:

first wall means for defining a first passage for delivering the blowby gas discharged from the valve chamber in a direction parallel to the abutting surface, the first passage extending in the cylinder head cover;

second wall means for defining a second passage for allowing the blowby gas passing through the first passage to flow along the abutting surface, the second passage extending on the abutting surface; and third wall means for defining a plurality of third passages for delivering the blowby gas passing through the second passage into the intake ports of the engine cylinders, the plurality of third passages extending in the cylinder head.

16. The apparatus as claimed in claim 15, further comprising seal means for sealing the second passage.

17. The apparatus as claimed in claim 15, further comprising partition means for regulating a flow amount of the blowby gas passing through the second passage.

18. The apparatus as claimed in claim 15, wherein the first passage comprises a blowby gas main passage extending in the direction of a row of the engine cylinders and a communication passage communicating the blowby gas main passage with the second passage.

19. The apparatus as claimed in claim 18, wherein the communication passage comprises a lateral communication passage connected with the blowby gas main passage and extending in a direction parallel to the abutting surface and in a direction perpendicular to the direction of the row of the engine cylinders, and a vertical communication passage extending in a direction perpendicular to the abutting surface and connecting the lateral communication passage with the second passage.

20. The apparatus as claimed in claim 15, wherein the second passage comprises a plurality of second passages extending in a direction of a row of the engine cylinders and splitting a flow of the blowby gas passing through the first passage into branch flows of the blowby gas.

21. The apparatus as claimed in claim 15, wherein the internal combustion engine comprises partition means for dividing an intake path inside the intake port into two intake passages, each of the plurality of third passages having one end open into one of the two intake passages.

22. The apparatus as claimed in claim 21, wherein the one end of each of the plurality of third passages is open into the one of the two intake passages downstream of the partition wall.

23. The apparatus as claimed in claim 1, further comprising valve means for adjusting a flow amount of the blowby gas flowing from the valve chamber into the first passage.

* * * * *